Feb. 9, 1960 B. D. LOUGHLIN 2,924,651

SIGNAL-TRANSLATING APPARATUS FOR A COLOR-TELEVISION RECEIVER

Filed Oct. 19, 1956 2 Sheets-Sheet 1

Feb. 9, 1960 B. D. LOUGHLIN 2,924,651

SIGNAL-TRANSLATING APPARATUS FOR A COLOR-TELEVISION RECEIVER

Filed Oct. 19, 1956 2 Sheets-Sheet 2

2,924,651

SIGNAL-TRANSLATING APPARATUS FOR A COLOR-TELEVISION RECEIVER

Bernard D. Loughlin, Huntington, N.Y., assignor to Hazeltine Research, Inc., Chicago, Ill., a corporation of Illinois Application October 19, 1956, Serial No. 617,038

8 Claims. (Cl. 178—5.4)

*General*

Figure 1:
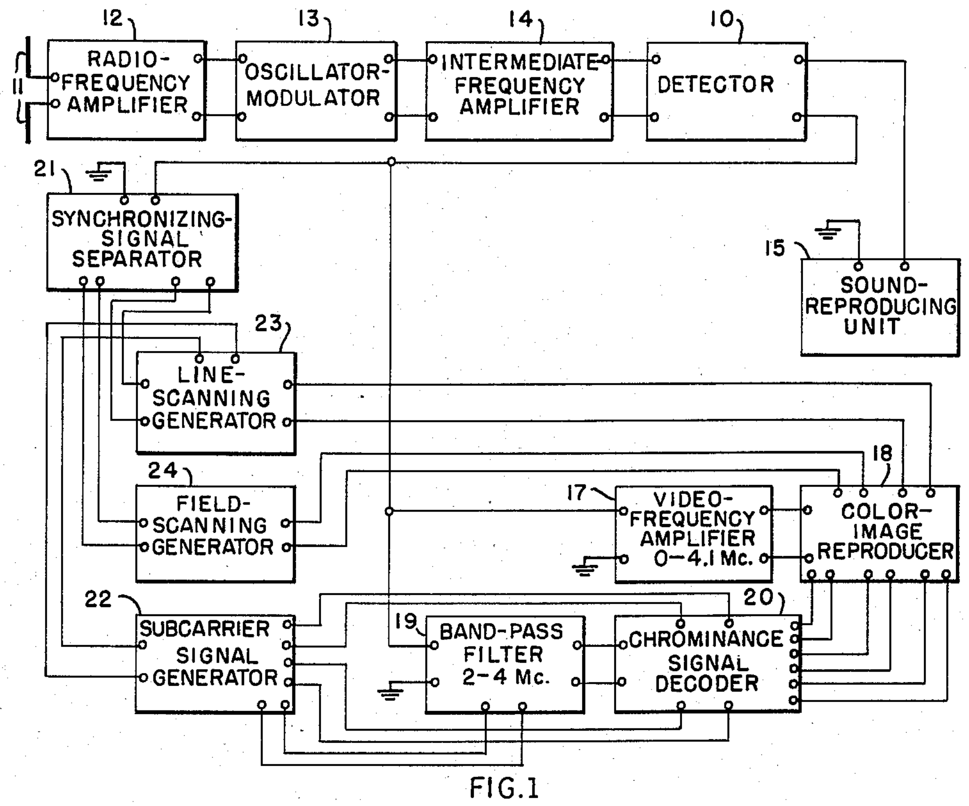

This invention relates to signal-translating apparatus for color-television receivers susceptible to luminance distortion of the reproduced image.

Heretofore, color-television receivers employing, for example, linear envelope picture-signal detectors have, in general, been subject to picture distortion inherently caused by such a detector upon the application thereto of an intermediate-frequency signal modulated by a composite video signal having luminance and chrominance components. For example, the reproduced picture ordinarily suffers luminance distortion, namely, luminance suppression in negative modulation transmission systems. This distortion arises because the presence of a single-side-band chrominance subcarrier signal at the detector causes an effective envelope variation of the luminance carrier signal. The detector responds to this envelope variation and, therefore, develops a distortion component. Heretofore, this distortion has, in general, been tolerated.

Also, in receivers of the intercarrier type, the sound carrier signal is applied to the picture-signal detector and its presence together with the chrominance subcarrier signal causes the detector to derive a sound-color beat note appearing as a 920-kilocycle variation of the luminance suppression component. Heretofore, this 920-kilocycle distortion component has been tolerated in some receivers or minimized by attenuating the sound carrier to an extreme degree in stages prior to the detector.

Color-television receivers normally employ cathode-ray tubes having nonunity gamma factors, that is, nonlinear signal light-translating characteristics. Such receivers are susceptible to distortion caused by the translation of the chrominance subcarrier signal somponent through the luminance channel to the cathode-ray tube. Accordingly, it has been the general practice to attenuate the chromiance subcarrier signal component relative to the luminance-signal component in the luminance channel to minimize the distortion. There are usually provided at least 12 decibels of attenuation of the chrominance subcarrier signal component relative to the luminance-signal component in the luminance channel.

It is an object of the present invention, therefore, to provide for a color-television receiver susceptible to luminance distortion of the reproduced image a new and improved signal-translating apparatus which avoids one or more of the above-mentioned limitations of prior such receivers.

It is another object of the invention to provide new and improved signal-translating apparatus for televised color picture wave signals in which luminance distortion is minimized.

It is another object of the invention to provide new and improved signal-translating apparatus for negative modulation televised color picture wave signals in which luminance suppression is minimized.

In accordance with a particular form of the invention, in a color-television receiver susceptible to luminance distortion of the reproduced image, signal-translating apparatus comprises circuit means for supplying a picture carrier signal and its modulation components including a video-frequency luminance-signal component and a single-side-band chrominance subcarrier signal component. The apparatus includes detector circuit means coupled to the supply circuit means for deriving a signal component representative of the luminance-signal component but subject to distortion introduced by the chrominance subcarrier component. The detector circuit means also is effective to derive a signal component representative of the chrominance subcarrier component. The apparatus also includes color-image-reproducing means responsive to the derived signal components and having a nonlinear signal light-translating characteristic effective to derive from the derived chrominance subcarrier component a luminance distortion component opposing the luminance distortion component introduced at the detector. The signal-translating apparatus also includes video-frequency signal-translating apparatus coupled between the detector circuit means and the color-image-reproducing means for applying the derived signal components thereto with relative gains so determined that the luminance distortion components have substantially mutually canceling effects at one or more luminance levels of the reproduced image.

For a better understanding of the present invention, together with other and further objects thereof, reference is had to the following description taken in connection with the accompanying drawings, and its scope will be pointed out in the appended claims.

Figure 1A:
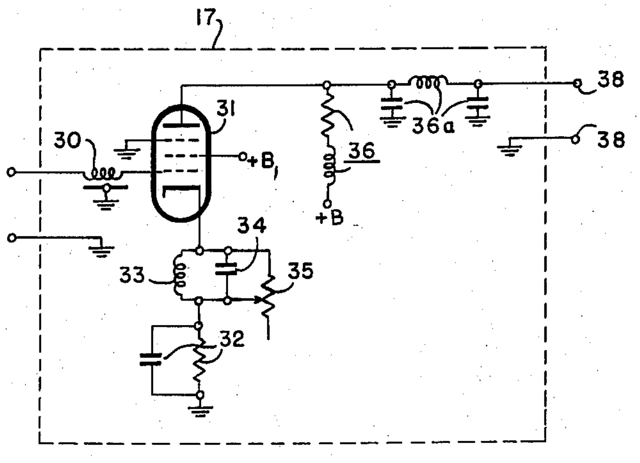
Figure 1B:
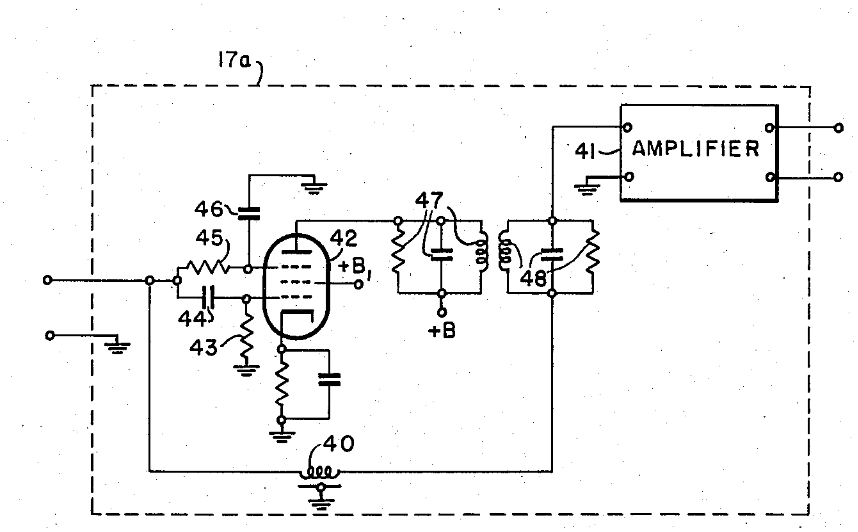
Figure 2:
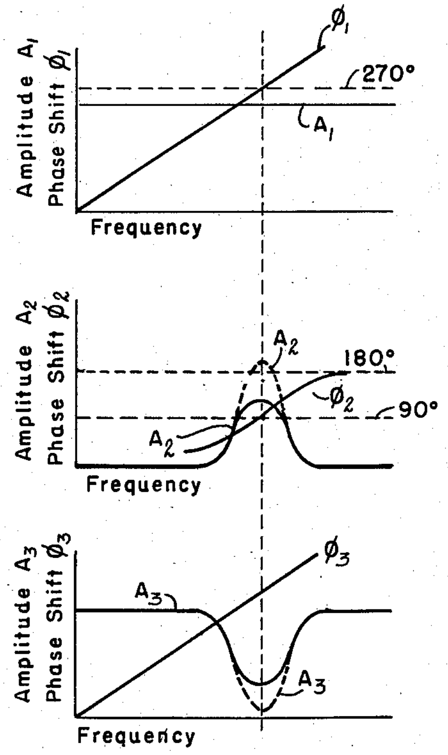

Referring to the drawings:

Fig. 1 is a schematic circuit diagram of a color-television receiver including signal-translating apparatus constructed in accordance with the invention;

Fig. 1*a* is a detailed circuit diagram of apparatus of the Fig. 1 receiver included in the signal-translating apparatus constructed in accordance with the invention;

Fig. 1*b* is a detailed circuit diagram of modified apparatus which may be included in the Fig. 1 receiver, and Fig. 2 is a set of graphs to aid in explaining the operation of the apparatus of Fig. 1*b*.

*General description and explanation of operation of Fig. 1 receiver*

Referring now more particularly to Fig. 1 of the drawings, the various elements of the color-television receiver represented in schematic form may individually be of conventional construction with the exception of video-frequency amplifier 17 which is represented in detail in Fig. 1*a*. The receiver may, for example, be of a constant luminance type described and claimed in applicant's copending application Serial No. 159,212, filed May 1, 1950, and entitled "Color-Television System." Receivers of this type are further described in the October 1951 issue of the Proceedings of the I.R.E. in an article entitled "Recent Improvements in Band-Shared Simultaneous Color-Television Systems" by applicant and in an article by Hirsch, Bailey, and applicant entitled "Principles of NTSC Compatible Color Television," Electronics, February 1952.

The Fig. 1 receiver comprises an antenna system 11 to which are coupled, in cascade and in the order named, a radio-frequency amplifier 12, an oscillator-modulator 13, and an intermediate-frequency amplifier 14, all of conventional construction, for deriving an intermediate-frequency composite color-television signal. The amplifier 14 serves as circuit means for supplying a picture carrier signal and its modulation components including a video-frequency luminance-signal component and a single-side-band chrominance subcarrier signal component.

The receiver also includes detector circuit means coupled to the supply circuit means for deriving a signal component representative of the luminance-signal component but subject to distortion introduced by the chrominance subcarrier component, the detector circuit means also being effective to derive a signal component representative of the chrominance subcarrier component. More particularly, the detector circuit means comprises a detector 10 which may, for example, be of a conventional linear envelope detector type and in which the derived luminance-signal component is subjected to distortion representing a luminance suppression. The detector 10 is effective to derive from the intermediate-frequency signal applied thereto a sound intercarrier beat-note signal and is coupled to a sound-reproducing unit 15 of conventional construction for applying the sound intercarrier signal thereto.

The output circuit of the detector 10 is also coupled to a luminance channel and a chrominance channel of the receiver. The luminance channel includes a video-frequency amplifier 17 having a pass band of, for example, 0–4.1 megacycles, described in detail hereinafter, and coupled to color-image-reproducing means comprising a reproducer 18 of conventional construction responsive to the derived luminance and chrominance subcarrier signal components and having a nonlinear signal light-translating characteristic effective to derive from the derived chrominance subcarrier component a luminance distortion component opposing the luminance distortion developed at the detector 10. The nonlinear signal light-translating characteristic may ordinarily be described in terms of a gamma factor between 2 and 3.

If it is desired to compensate in the color-image reproducer for the 920-kilocycle variation of luminance, the pass band of the amplifier 17 may be extended to 5.1 megacycles so that it translates the sound carrier signal.

The chrominance channel of the receiver includes a band-pass filter 19 having a pass band of, for example, 2–4 megacycles coupled to a chrominance-signal decoder 20 of conventional construction for deriving, for example, $R-Y$, $G-Y$, and $B-Y$ chrominance signals for application to the reproducer 18. One output circuit of the band-pass filter 19 is coupled to a gated input circuit of a stabilized subcarrier signal generator 22 of conventional phase-controlled oscillator design and responsive to the color burst synchronizing signal. The unit 22 has a pair of output circuits connected to input circuits of the chrominance-signal decoder 20 for providing a pair of phase-displaced unmodulated subcarrier signals, for example, signals in phase quadrature which individually beat with the modulated signal component applied to the decoder 20 by the filter 19 to derive in the decoder 20 the $R-Y$, $G-Y$, and $B-Y$ color-difference signals.

The output circuit of the detector 10 is also coupled to a synchronizing-signal separator 21 for separating the line-synchronizing and field-synchronizing signals from the video-frequency signals applied thereto by the detector 10.

The receiver also includes line-scanning and field-scanning generators 23 and 24 connected in a conventional manner to separator 21 and to the scanning circuits of the color-image reproducer 18 for effecting scanning. The output circuit of the line-scanning generator 23 is also connected to the gated circuit of the subcarrier signal generator 22 for separating the color burst synchronizing signal by means of a gating operation to control the oscillator phase.

*Description of Fig. 1a Apparatus*

Referring now more particularly to Fig. 1*a*, the video-frequency amplifier 17 is represented in detail. This amplifier has an input circuit including a delay line 30 of a conventional wound-line type for delaying the wide band luminance signal by an amount equal to the inherent delay of the chrominance signal in the narrow band chrominance channel 19, 20. The input circuit of the amplifier 17 is coupled to the first control electrode and cathode of a tube 31 of a conventional five-electrode type. The cathode circuit of the tube includes a self-biasing network 32 and a resonant circuit 33, 34 shunted by an adjustable resistor 35 and tuned to the frequency of the detected chrominance subcarrier component. The anode of the tube 31 is coupled through a conventional video-frequency load circuit 36 and a filter network **36*a* to output terminals 38, 38. The resonant circuit 33, 34, resistor 35, and the filter network 36*a* are designed to impart a pass band of 0–4.1 megacycles to the amplifier 17 with the response in the vicinity of 3.6 megacycles being adjustable by means of resistor 35. The amplifier 17** is effective to provide a gain for the derived chrominance subcarrier component preferably in the range 0–6 decibels less than the gain provided for the derived luminance-signal component, the relative gains being so determined that the luminance distortion components have substantial mutually canceling effects at one or more luminance levels of the reproduced image.

*Operation of apparatus of Figs. 1 and 1a*

Considering now the operation of the units 10, 17, and 18 of the Fig. 1 receiver, the envelope of the intermediate-frequency signal applied to the detector 10 is derived thereby and contains a luminance-signal component and a chrominance subcarrier signal component. The luminance-signal component is subject to distortion introduced by the chrominance subcarrier component because the chrominance subcarrier component is a single-side-band component at the detector input circuit.

As will be demonstrated subsequently in mathematical terms, the operation of a linear envelope detector in the presence of a single-side-band component causes the derivation of a component which increases the instantaneous magnitude of the component derived in the detector output circuit. Since the received television signal contains a negative modulation luminance-signal component, that is, a luminance-signal component which modulates the carrier to represent white by a minimum carrier amplitude and black by a greater carrier amplitude, an increase of the instantaneous magnitude of the component derived in the detector output circuit represents a suppression of the luminance reproduced in response to that component.

The video-frequency amplifier 17 translates the derived luminance-signal component including its distortion component and the chrominance subcarrier component. Referring now to Fig. 1*a*, the delay line 30 delays the translated signal components by a desired amount and tube 31 and its associated circuit components amplify the applied signal components for application to the color-image reproducer 18 of Fig. 1. The resonant circuit 33, 34 and its adjustable shunt resistor 35 serve as an adjustable degenerative circuit to reduce the gain of the amplifier 17 for the chrominance subcarrier signal component with respect to the gain of the amplifier for the luminance-signal component.

The color-image reproducer 18 responds to the luminance and chrominance subcarrier components applied thereto by the amplifier 17 and to the chrominance signals applied by the chrominance-signal decoder 20 to reproduce a color image. However, the image reproducer 18 because of its nonunity gamma factor derives from the chrominance subcarrier signal component an average or low-frequency luminance component which increases the average value of light output of the reproducer. If the sound intercarrier beat-note signal is also applied to the reproducer 18, the reproducer also derives a 920-kilocycle light variation component which opposes the 920-kilocycle component introduced at the detector 10.

By proper adjustment of the adjustable resistor 35 of Fig. 1*a*, the amplitude of the chrominance subcarrier component applied to the reproducer 18 by the video-frequency amplifier 17 may be so controlled that the luminance distortion component developed in the reproducer 18 provides a substantial cancellation of the luminance distortion component developed in the detector 10 as it appears at the reproducer 18 at a medium luminance level of the reproduced image. As will be demonstrated subsequently, for a tube having a gamma factor in the range between 2 and 3, the gain of the video-frequency amplifier 17 for the chrominance-signal component preferably is in the range of 0–6 decibels less than the gain of the amplifier for the luminance component to provide a substantial cancellation of the distortion component at a medium luminance level.

Similarly, the gain of the video-frequency amplifier 17 for the sound carrier signal may be determined to cause a substantial cancellation of the 920-kilocycle luminance variation component at a medium luminance level by, for example, proportioning the filter 36a to translate a portion of the sound carrier signal at approximately 4.5 megacycles.

*Description of Fig. 1b apparatus*

Referring now to Fig. 1*b* of the drawings, there is represented video-frequency signal-translating apparatus 17a which may be substituted for the video-frequency amplifier 17 of the Fig. 1 receiver to cause cancellation of the luminance distortion components over a range of luminance levels of the reproduced image. This video-frequency signal-translating apparatus includes means responsive to the derived luminance-signal component for varying the relative gains of the derived luminance and chrominance subcarrier signal components in accordance with the variations of the derived luminance-signal component to cause the luminance distortion components to have substantial mutually canceling effects over a range of luminance levels of the reproduced image. More particularly, the apparatus comprises a delay line 40 for translating the derived signal components to an amplifier 41 of conventional construction. The apparatus also includes a channel in parallel relation with the delay line and tuned to the frequency of the derived chrominance subcarrier component and responsive to the derived luminance-signal component for varying the translation of the derived chrominance subcarrier component by the channel in accordance with variations of the derived luminance-signal component.

The channel just mentioned comprises an electron-discharge tube 42 having a first control electrode-cathode circuit including a resistor-condenser network 43, 44 for primarily translating the chrominance subcarrier signal component while attenuating the luminance-signal component. The third control electrode-cathode circuit of the tube 42 includes a resistor-condenser network 45, 46 for primarily translating the derived luminance-signal component while attenuating the chrominance-signal component.

A resonant circuit 47 tuned to the chrominance subcarrier frequency is included in the anode-cathode circuit of the tube 42. A secondary resonant circuit 48 tuned to the chrominance subcarrier frequency is coupled to the resonant circuit 47. The output circuits of the delay line 40 and the resonant circuit 48 are coupled to supply chrominance subcarrier components in phase opposition to vary the relative gains of the derived luminance and chrominance subcarrier signal components in accordance with the variations of the luminance-signal component to cause the luminance distortion components to have substantial mutually canceling effects for a range of luminance levels of the reproduced image.

*Operation of Fig. 1b apparatus*

Considering now the operation of the Fig. 1*b* apparatus, the delay line 40 translates the luminance and chrominance subcarrier signal components in accordance with the flat frequency-response characteristic represented by curve $A_1$ and phase-shift characteristic represented by curve $\phi_1$ of Fig. 2. The tube 42 and its associated components translate the chrominance subcarrier signal component to the resonant circuit 48 in accordance with the frequency-response and phase-shift characteristics represented by solid line curves $A_2$ and $\phi_2$ of Fig. 2 for a given luminance level of the chrominance-signal component. As the luminance level of the luminance-signal component varies, the gain of the tube 42 varies and the amplitude of the chrominance subcarrier component derived in circuit 48 varies as, for example, represented by broken line curve $A_2$ of Fig. 2.

The chrominance subcarrier components developed in the resonant circuit 48 and the delay line 40 are in phase opposition as they are applied to the amplifier 41 and, thus, the delay line 40 and its shunt channel have an over-all frequency-response characteristic represented by solid line curve $A_3$ with variations of the amplitude of the chrominance subcarrier signal being represented, for example, by broken line curve $A_3$. The over-all phase-shift characteristic is represented by curve $\varphi_3$. Thus, the Fig. 1*b* apparatus is effective to vary the amplitude of the chrominance subcarrier signal and the amplitude of the distortion component developed in the reproducer 18 from the chrominance subcarrier signal component in accordance with variations of the luminance-signal component to cause the luminance distortion component developed in the detector 10 and the luminance distortion component developed in the chrominance reproducer 18 to have substantial mutually canceling effects over a range of luminance levels of the reproduced image.

*Mathematical explanation of operation of apparatus of Figs. 1, 1a, 1b*

Considering now the operation of the signal-translating apparatus in mathematical terms, the signal developed at the output circuit of the intermediate-frequency amplifier 14 may be represented by the following equation:

$$e=m_1 \cos \omega_1 t+m_2 \cos (\delta+\omega_1)t \qquad (1)$$

where $e$=instantaneous magnitude of the composite carrier signal including its chrominance subcarrier.

$m_1$=instantaneous picture carrier-signal amplitude level (exclusive of chrominance subcarrier).

$\omega_1$=intermediate-frequency picture carrier angular velocity.

$m_2$=instantaneous chrominance subcarrier signal amplitude.

$\delta$=difference angular velocity between intermediate-frequency picture carrier and intermediate-frequency chrominance subcarrier signals (which is the video chrominance subcarrier angular velocity).

It may be shown that the envelope variation (V) resulting from the two signal components represented by Equation 1 is:

$$V=[m_1^2+m_2^2+2m_1m_2 \cos \delta t]^{1/2} \qquad (2)$$

Rewriting Equation 2:

$$V=(m_1^2+m_2^2)^{1/2}(1+a \cos \delta t)^{1/2} \qquad (3)$$

where $$a=\frac{2m_1m_2}{m_1^2+m_2^2} \qquad (4)$$

Equation 3 may be analyzed in terms of a power series with corresponding frequency terms collected as follows:

$$e_0=(m_1^2+m_2^2)^{1/2}\left(1-\frac{a^2}{16}-\frac{15a^4}{1024}\cdots\right) \qquad (5)$$

$$e_1=(m_1^2+m_2^2)^{1/2}\frac{a}{2}\left(1+\frac{3a^2}{32}+\frac{35a^4}{1024}\cdots\right) \qquad (6)$$

where $e_0$ and $e_1$=amplitude of the direct-current and fundamental chrominance subcarrier frequency terms, respectively, of the envelope variation.

Let:

$$r=\frac{m_2}{m_1} \quad (7)$$

Then from Equations 4 and 7:

$$a=\frac{2r}{1+r^2} \quad (8)$$

Rewriting Equations 5 and 6 with substitutions from Equations 7 and 8:

$$e_0=m_1\left(1+\frac{1}{4}r^2+\frac{1}{64}r^4\cdots\right) \quad (9)$$

$$e_1=m_1r\left(1-\frac{1}{8}r^2-\frac{1}{64}r^4\cdots\right) \quad (9a)$$

In the following considerations, the terms of Equations 9 and 9*a* of higher order than square law will be neglected because of their small amplitudes. Thus, rewriting Equations 9 and 9*a*:

$$e_0=m_1\left(1+\frac{1}{4}r^2\right) \quad (10)$$

$$e_1=m_1r\left(1-\frac{1}{8}r^2\right) \quad (10a)$$

In order to express the luminance and chrominance components derived by the detector in terms of normalized equations (that is, relations in which the minimum luminance level after detection corresponds to 0 and the maximum luminance level corresponds to 1), it will be assumed that the blanking level as it appears on the picture carrier signal applied to the detector 10 is, for example, 1.2 units while the reference white level is .2 unit. Then a picture carrier level produced by a transmitted luminance level of $y_1$ units may be expressed as follows:

$$m_1=1.2-y_1 \quad (11)$$

Also, the luminance output signal of the detector 10 may be expressed in terms of $y$ units relative to the blanking level as follows:

$$e_0=1.2-y \quad (12)$$

Substituting Equations 7, 11, and 12 in Equation 10 and solving for $y$:

$$y=y_1-\frac{1}{4}\frac{m_2^2}{(1.2-y_1)} \quad (13)$$

In Equation 13 the term $$\left[-\frac{1}{4}\frac{m_2^2}{(1.2-y_1)}\right]$$

represents the suppression of the luminance signal due to the operation of the envelope detector in the presence of the single-side-band chrominance signal.

Substituting Equations 7, 11, and 12 in Equation 10*a*:

$$e_1=m_2\left(1-\frac{1}{8}\left[\frac{m_2}{1.2-y_1}\right]^2\right) \quad (14)$$

In Equation 14 the term $$-\frac{1}{8}\left[\frac{m_2}{1.2-y_1}\right]^2$$

represents a suppression of the chrominance signal due to the operation of the envelope detector in the presence of the luminance signal and the single-side-band chrominance signal.

In order to derive equations representing the increase of luminance due to the application of the chrominance subcarrier signal through the luminance channel to an image reproducer having a nonunity gamma ($\gamma$), normalized green, red, and blue signals $g_0$, $r_0$, $b_0$ applied to the image reproducer may be expressed as follows:

$$g_0=g+\alpha e_1\cos\delta t \quad (15)$$

$$r_0=r+\alpha e_1\cos\delta t \quad (16)$$

$$b_0=b+\alpha e_1\cos\delta t \quad (17)$$

where $g, r, b$=normalized green, red, and blue signal components applied to the image reproducer, each having a luminance component $y$.

$\alpha$=relative gain of the chrominance signal through the amplifier 17 with respect to the effective gain of the luminance component $y$ of the color signals $g, r, b$.

The luminance reproduced in response to these signals may be expressed:

$$Y_0=L_Gg_0^\gamma+L_Rr_0^\gamma+L_Bb_0^\gamma \quad (18)$$

where $L_G, L_R, L_B$=luminance factors for the green, red, and blue components.

Substituting Equations 15, 16 and 17 in Equation 18 and employing a Taylor expansion to obtain the direct-current components which represent average or low-frequency luminance variations and ignoring the relatively small direct-current contributions of terms of the expansion higher than square-law terms, the average or low-frequency luminance may be expressed:

$$Y=L_G\left(g^\gamma+\frac{\gamma(\gamma-1)}{2}g^\gamma\frac{e_1^2}{g^2}\frac{\alpha^2}{2}\right)+L_R\left(r^\gamma+\frac{\gamma(\gamma-1)}{2}r^\gamma\frac{e_1^2}{r^2}\frac{\alpha^2}{2}\right)+L_B\left(b^\gamma+\frac{\gamma(\gamma-1)}{2}b^\gamma\frac{e_1^2}{b^2}\frac{\alpha^2}{2}\right) \quad (19)$$

Rewriting Equation 19 with terms regrouped:

$$Y=(L_Gg^\gamma+L_Rr^\gamma+L_Bb^\gamma)+\frac{\gamma(\gamma-1)}{2}\frac{e_1^2\alpha^2}{2}\left[L_G\frac{g^\gamma}{g^2}+L_R\frac{r^\gamma}{r^2}+L_B\frac{b^\gamma}{b^2}\right] \quad (20)$$

The first term of Equation 20 represents the luminance normally reproduced by the color signals $g$, $r$, $b$ while the second term represents the luminance increase due to the application of the chrominance signal to an image reproducer having a nonunity gamma factor. In prior receivers because of the large attenuation of the chrominance signals in the luminance channel, the second term of Equation 20 approximates 0.

For an image reproducer having a gamma factor of 3, the luminance increase $Y_1$ represented by the second term of Equation 20 may be expressed:

$$Y_i=k_1\frac{\alpha^2e_1^2}{2} \quad (21)$$

where $$k_1=L_G+L_R+L_B$$

For an image reproducer having a gamma factor of 3, the luminance increase $Y_1$ represented by the second term of Equation 20 may be expressed:

$$Y_i=\left(\frac{3e_1^2\alpha^2}{2}\right)(L_Gg+L_Rr+L_Bb) \quad (22)$$

Because of the constant luminance proportioning of the receiver, the chrominance components of the $g$, $r$, $b$ color signals multiplied by factors of Equation 22 cancel. Thus, only the luminance $y$ component of the $g$, $r$, $b$ color signals contributes to the luminance increase $Y_1$. Accordingly, Equation 22 may be expressed:

$$Y_i=\left(\frac{3e_1^2\alpha^2}{2}\right)(L_Gy+L_Ry+L_By) \quad (22a)$$

Equation 22*a* may be rewritten as follows:

$$Y_i = k_1 y \frac{3e_1^2\alpha^2}{2} \quad (23)$$

Thus, for gamma factors of 2 and 3 the increase of luminance due to translation of the chrominance subcarrier signal through the luminance channel is independent of the chrominance signals which contribute to the reproduced picture.

In an article entitled "The Constant Luminance Principle in NTSC Color Television" by Bailey, Proceedings of the I.R.E., January 1954, it is shown that in a receiver having a nonunity gamma factor and operating in accordance with the constant luminance principle, the luminance reproduced due to the chrominance signals translated through the chrominance channel is an additive component of the reproduced luminance and does not affect the luminance reproduced due to the luminance signal translated through the luminance channel. Accordingly, the luminance reproduced due to the luminance signal translated through the luminance channel may be expressed:

$$Y_l = (L_G + L_R + L_B) y^\gamma \quad (24)$$

For gamma factors of 2 and 3, Equation 24 may be rewritten as Equations 25 and 26, respectively:

$$Y_l = k_1 y^2 \quad (25)$$

$$Y_l = k_1 y^3 \quad (26)$$

Substituting Equation 13 in Equations 25 and 26:

$$Y_e = k_1 \left[ y_1 - \frac{1}{4} \frac{m_2^2}{(1.2 - y_1)} \right]^2 \quad (27)$$

$$Y_e = k_1 \left[ y_1 - \frac{1}{4} \frac{m_2^2}{(1.2 - y_1)} \right]^3 \quad (28)$$

Adding Equations 21 and 23 to Equations 27 and 28, respectively, the total average luminance reproduced due to signals through the luminance channel including the undesired luminance suppression component and the chrominance subcarrier signal in the luminance channel may be expressed:

$$Y_t = k_1 \left[ y_1 - \frac{1}{4} \frac{m_2^2}{(1.2 - y_1)} \right]^2 + k_1 \frac{\alpha^2 e_1^2}{2} \quad (29)$$

$$Y_t = k_1 \left[ y_1 - \frac{1}{4} \frac{m_2^2}{(1.2 - y_1)} \right]^3 + k_1 y \frac{3e_1^2\alpha^2}{2} \quad (30)$$

Substituting Equation 14 in Equation 29 and expanding terms, Equation 29 may be rewritten:

$$Y_t = k_1 \left[ y_1^2 - \frac{1}{2} y_1 \frac{m_2^2}{(1.2 - y_1)} + \frac{1}{16} \frac{m_2^4}{(1.2 - y_1)^2} + \frac{\alpha^2}{2} m_2^2 - \frac{\alpha^2}{8} \frac{m_2^4}{(1.2 - y_1)^2} + \frac{\alpha^2}{128} \frac{m_2^6}{(1.2 - y_1)^4} \right] \quad (31)$$

The desired luminance reproduced due to the luminance signal through the luminance channel is $y_1^2$ when the gamma factor equals 2. The undesired square-law terms of Equation 31 can be eliminated when:

$$\alpha^2 = \frac{y_1}{1.2 - y_1} \quad (32)$$

Similarly, with the normally encountered amounts of luminance suppression, undesired square-law terms included in a similar expression of Equation 30 can be eliminated when:

$$\alpha^2 = \frac{1}{2} \frac{y_1}{(1.2 - y_1)} \quad (33)$$

The undesired terms of higher order than square law are sufficiently small with respect to the square-law terms that cancellation of the square-law terms provides a substantial reduction of visible distortion.

Thus, from Equations 32 and 33, to minimize the undesired terms at a medium luminance level ($y_1$ in the range of .3 to .8, inclusive), a fixed value of $\alpha$ may be selected in the range of $-4.8$ to $+3.0$ db for $\gamma=2$ and in the range of $-7.8$ to 0 db for $\gamma=3$. If a value of $\alpha$ in the range of $-6$ to 0 db is selected, a substantial reduction of luminance distortion will be accomplished at a medium luminancce level.

To minimize the undesired terms over a wide luminance range, the luminance channel should have a response at subcarrier frequency which varies with respect to the low video-frequency response with variations in luminance level. This may be accomplished by employing apparatus of the Fig. 1*b* type in the Fig. 1 receiver From the foregoing description, it will be apparent that signal-translating apparatus constructed in accordance with the invention has the advantage of minimizing luminance distortion of the reproduced image in a color-television receiver susceptible to such distortion In particular, in a negative modulation color-television receiver the apparatus is effective to minimize luminance suppression of the reproduced image originally caused by distortion components developed at the second detector. The apparatus accomplishes this by effecting a substantial cancellation of the luminance suppression component introduced at the detector by means of a distortion component introduced at the image reproducer due to its non-unity gamma factor.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver susceptible to luminance distortion of the reproduced image, signal-translating apparatus comprising: circuit means for supplying a picture carrier signal and its modulation components including a video-frequency luminance-signal component and a single-side-band chrominance subcarrier signal component; detector circuit means coupled to said supply circuit means for deriving a signal component representative of said luminance-signal component but subject to distortion introduced by said chrominance subcarrier component, said detector circcuit means also being effective to derive a signal component representative of said chrominance subcarrier component; color-image-reproducing means responsive to said derived signal components and having a nonlinear signal light-translating characteristic effective to derive from said derived chrominance subcarrier component a luminance distortion component opposing the luminance distortion component introduced at said detector; and video-frequency signal-translating apparatus coupled between said detector circuit means and said color-image-reproducting means for applying said derived signal components thereto with relative gains so determined that said luminance distortion components have substantial mutually canceling effects at one or more luminance levels of the reproduced image.

2. In a color-television receiver susceptible to luminance distortion of the reproduced image, signal-translating apparatus comprising: circuit means for supplying a picture carrier signal and its modulation components including a negative modulation video-frequency luminance-signal component and a single-side-band chrominance subcarrier signal component; detector circuit means coupled to said supply circuit means for deriving a signal component representative of said luminance-signal component but subject to distortion introduced by said chrominance subcarrier component and representing a suppression of the luminance represented by said luminance-signal component, said detector circuit means also being effective to derive a signal component representative of said chrominance subcarrier component; color-image-reproducing means responsive to said derived signal components and having a nonlinear signal light-translating characteristic effective to derive from said derived chrominance subcarrier component a luminance distortion component opposing the luminance distortion component introduced at said detector; and video-frequency signal-translating apparatus coupled between said detector circuit means and said color-image-reproducing means for applying said derived signal components thereto with relative gains so determined that said luminance distortion components have substantial mutually canceling effects at one or more medium luminance levels of the reproduced image.

3. In a color-television receiver susceptible to luminance distortion of the reproduced image, signal-translating apparatus comprising: circuit means for supplying a picture carrier signal and its modulation components including a negative modulation video-frequency luminance-signal component and a single-side-band chrominance subcarrier signal component and for supplying a sound carrier signal; detector circuit means coupled to said supply circuit means for deriving a signal component representative of said luminance-signal component but subject to distortion introduced by said chrominance subcarrier component and said sound carrier signal and representing a varying suppression of the luminance represented by said luminance-signal component, said detector circuit means also being effective to derive signal components representative of said chrominance subcarrier component and said sound carrier signal; color-image-reproducing means responsive to said derived signal components and having a nonlinear signal light-translating characteristic effective to derive from said derived signal components a luminance distortion component opposing the luminance distortion component introduced at said detector; and video-frequency signal-translating apparatus coupled between said detector circuit means and said color-image-reproducing means for applying said derived signal components thereto with relative gains so determined that said luminance distortion components have substantial mutually canceling effects at one or more luminance levels of the reproduced image.

4. In a color-television receiver susceptible to luminance distortion of the reproduced image, signal-translating apparatus comprising: circuit means for supplying a picture carrier signal and its modulation components including a video-frequency luminance-signal component and a single-side-band chrominance subcarrier signal component; an envelope detector circuit coupled to said supply circuit means for deriving a signal component representative of said luminance-signal component but subject to distortion introduced by said chrominance subcarrier component, said detector circuit means also being effective to derive a signal component representative of said chrominance subcarrier component; color-image-reproducing means responsive to said derived signal components and having a nonlinear signal light-translating characteristic effective to derive from said derived chrominance subcarrier component a luminance distortion component opposing the luminance distortion component introduced at said detector; and video-frequency signal-translating apparatus coupled between said detector circuit and said color-image reproducing means for applying said derived signal components thereto with relative gains so determined that said luminance distortion components have substantial mutually canceling effects at one or more luminance levels of the reproduced image.

5. In a color-television receiver susceptible to luminance distortion of the reproduced image, signal-translating apparatus comprising: circuit means for supplying a picture carrier signal and its modulation components including a video-frequency luminance-signal component and a single-side-band chrominance subcarrier signal component; detector circuit means coupled to said supply circuit means for deriving a signal component representative of said luminance-signal component but subject to distortion introduced by said chrominance subcarrier component, said detector circuit means also being effective to derive a signal component representative of said chrominance subcarrier component; color-image-reproducing means responsive to said derived signal components and having a gamma factor between the values of 2 and 3 causing the derivation, from said derived chrominance subcarrier component, of a luminance distortion component opposing the luminance distortion component introduced at said detector; and video-frequency signal-translating apparatus coupled between said detector circuit means and said color-image-reproducing means for applying said derived signal components thereto, said video-frequency signal-translating apparatus providing a gain for said derived chrominance subcarrier component in the range of 0–6 decibels less than the gain provided for said derived luminance-signal component, said relative gains being so determined that said luminance distortion components have substantial mutually canceling effects at one or more medium luminance levels of the reproduced image.

6. In a color-television receiver susceptible to luminance distortion of the reproduced image, signal-translating apparatus comprising: circuit means for supplying a picture carrier signal and its modulation components including a video-frequency luminance-signal component and a single-side-band chrominance subcarrier signal component; detector circuit means coupled to said supply circuit means for deriving a signal component representative of said luminance-signal component but subject to distortion introduced by said chrominance subcarrier component, said detector circuit means also being effective to derive a signal component representative of said chrominance subcarrier component; color-image-reproducing means responsive to said derived signal components and having a nonlinear signal light-translating characteristic effective to derive from said derived chrominance subcarrier component a luminance distortion component opposing the luminance distortion component introduced at said detector; and video-frequency signal-translating apparatus coupled between said detector circuit means and said color-image-reproducing means for applying said derived signal components thereto, said video-frequency signal-translating apparatus comprising a video-frequency amplifier having a degenerative circuit tuned to the frequency of said derived chrominance subcarrier component to provide a gain for said derived chrominance subcarrier component in the range of 0–6 decibels less than the gain provided for said derived luminance-signal component, said relative gains being so determined that said luminance distortion components have substantial mutually canceling effects at one or more medium luminance levels of the reproduced image.

7. In a color-television receiver susceptible to luminance distortion of the reproduced image, signal-translating apparatus comprising: circuit means for supplying a picture carrier signal and its modulation components including a video-frequency luminance-signal component and a single-side-band chrominance subcarrier signal component; detector circuit means coupled to said supply circuit means for deriving a signal component representative of said luminance-signal component but subject to distortion introduced by said chrominance subcarrier component, said detector circuit means also being effective to derive a signal component representative of said chrominance subcarrier component; color-image-reproducing means responsive to said derived signal components and having a nonlinear signal light-translating characteristic effective to derive from said derived chrominance subcarrier component a luminance distortion component opposing the luminance distortion component introduced at said detector; and video-frequency signal-translating apparatus coupled between said detector circuit means and said color-image-reproducing means for applying said derived signal components thereto, said video-frequency signal-translating apparatus including means responsive to said derived luminance-signal component for varying the relative gains of said derived luminance and chrominance subcarrier signal components in accordance with variations of said derived luminance-signal component to cause said luminance distortion components to have substantial mutually canceling effects over a range of luminance levels of the reproduced image.

8. In a color-television receiver susceptible to luminance distortion of the reproduced image, signal-translating apparatus comprising: circuit means for supplying a picture carrier signal and its modulation components including a video-frequency luminance-signal component and a single-side-band chrominance subcarrier signal component; detector circuit means coupled to said supply circuit means for deriving a signal component representative of said luminance-signal component but subject to distortion introduced by said chrominance subcarrier component, said detector circuit means also being effective to derive a signal component representative of said chrominance subcarrier component; color-image-reproducing means responsive to said derived signal components and having a nonlinear signal light-translating characteristic effective to derive from said derived chrominance subcarrier component a luminance distortion component opposing the luminance distortion component introduced at said detector; and video-frequency signal-translating apparatus coupled between said detector circuit means and said color-image-reproducing means for applying said derived signal components thereto, said video-frequency signal-translating apparatus comprising a delay line for translating said derived signal components and a channel in parallel relation with said delay line and tuned to the frequency of said derived chrominance subcarrier component and responsive to said derived luminance-signal component for varying the translation of said derived chrominance subcarrier component by said channel in accordance with variations of said derived luminance-signal component, said delay line and said channel having output circuits coupled to supply chrominance subcarrier components in phase opposition to vary the relative gains of said derived luminance and chrominance subcarrier signal components in accordance with variations of said luminance-signal component to cause said luminance distortion components to have substantial mutually conceling effects for a range of luminance levels of said reproduced image.

References Cited in the file of this patent

UNITED STATES PATENTS

| | | |
|---|---|---|
| 2,734,940 | Loughlin | Feb. 14, 1956 |
| 2,807,661 | Espenlaub et al. | Sept. 24, 1957 |